United States Patent
Xu

(10) Patent No.: US 10,203,450 B2
(45) Date of Patent: Feb. 12, 2019

(54) BACKLIGHT MODULE AND THE MANUFACTURING METHOD THEREOF

(71) Applicant: Wuhan China Star Optoelectronics Technology Co., Ltd., Wuhan, Hubei (CN)

(72) Inventor: Pengbo Xu, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 325 days.

(21) Appl. No.: 15/021,710

(22) PCT Filed: Feb. 25, 2016

(86) PCT No.: PCT/CN2016/074573
§ 371 (c)(1),
(2) Date: Mar. 14, 2016

(87) PCT Pub. No.: WO2017/133033
PCT Pub. Date: Aug. 10, 2017

(65) Prior Publication Data
US 2018/0059315 A1 Mar. 1, 2018

(30) Foreign Application Priority Data
Feb. 2, 2016 (CN) .......................... 2016 1 0074808

(51) Int. Cl.
*G02F 1/00* (2006.01)
*F21V 8/00* (2006.01)
*B33Y 80/00* (2015.01)
*B29D 11/00* (2006.01)

(52) U.S. Cl.
CPC ...... *G02B 6/0088* (2013.01); *B29D 11/00673* (2013.01); *B29D 11/00721* (2013.01); *B33Y 80/00* (2014.12); *G02B 6/0055* (2013.01); *G02B 6/0065* (2013.01)

(58) Field of Classification Search
CPC ..................... G02F 1/133308; G02B 6/0088
See application file for complete search history.

(56) References Cited

U.S. PATENT DOCUMENTS

2007/0030699 A1* 2/2007 Tseng ................. G02B 6/0055
362/633
2015/0362654 A1* 12/2015 Sadasivan ............. G02B 6/009
362/609

FOREIGN PATENT DOCUMENTS

| CN | 103486480 A | 1/2014 |
|---|---|---|
| CN | 104421768 A | 3/2015 |
| CN | 104965334 A | 10/2015 |
| JP | 2013254115 A | 12/2013 |

* cited by examiner

Primary Examiner — Andrew Coughlin
(74) Attorney, Agent, or Firm — Andrew C. Cheng

(57) ABSTRACT

The present disclosure discloses a backlight module and the manufacturing method thereof. The backlight module comprises a substrate, a plastic frame, a light guide plate, and a film set. The plastic frame is formed on the substrate through printing, which forms a housing space together with the substrate. The light guide plate and the film set are sequentially stacked in the housing space. The backlight module according to the present disclosure will not affect the display of the liquid crystal display panel during thermal expansion.

13 Claims, 2 Drawing Sheets

BACKLIGHT MODULE AND THE MANUFACTURING METHOD THEREOF

BACKGROUND OF THE DISCLOSURE

1. Field of the Disclosure

The present disclosure relates to the technology fields of liquid crystal display technology, and in particular to a backlight module and the manufacturing method thereof.

2. The Related Arts

Liquid crystal display technology is developed rapidly. Wherein, the backlight module is used for light source. The backlight module plastic frame is usually attached to the back sheet by double-sided adhesive, which is enclosed to be an optical cavity. The double-sided adhesive is easily inserted into the optical cavity due to tolerances during assembly, which elevates the light guide plate or other components in the optical cavity. After the backlight module and the panel are assembled, the interval between the optical cavity components and the panel is reduced. If the optical cavity components are thermal expansion, the components can not expand to the surrounding to release the deformation due to the narrow interval. At this time, expansion deformation will gather toward the center and form wavy pattern, which will affect the display of the liquid crystal panel.

SUMMARY OF THE DISCLOSURE

The present disclosure provides a backlight module and the manufacturing method thereof, which solves the technology problems of the liquid crystal display being easily affected after the thermal expansion of the film in the backlight module.

To solve the above technical issue, the present disclosure provides a backlight module, comprising: a substrate, a plastic frame, a light guide plate, and a film set, the plastic frame being formed directly on the edge of the substrate through 3D printing, which forms a housing space together with the substrate, the light guide plate and the film set being sequentially stacked in the housing space; the backlight module further comprising a rectangular tape, the rectangular tape being pasted on the top surface of the plastic frame away from the substrate and on the outer surface of the film set to connect the plastic frame and the film set, the outer surface of the film set corresponding to the top surface of the plastic frame facing a stepped surface recessed in the housing space.

Wherein, the substrate is a metal back.

Wherein, the substrate is a reflective sheet.

To solve the above technical issue, the present disclosure provides a backlight module, comprising a substrate, a plastic frame, a light guide plate, and a film set, the plastic frame being pasted on the substrate through printing, which forms a housing space together with the substrate, the light guide plate and the film set being sequentially stacked in the housing space.

Wherein, the plastic frame being formed directly on the edge of the substrate through 3D printing.

Wherein, the substrate is a metal back.

Wherein, the substrate is a reflective sheet.

Wherein, the backlight module further comprising a rectangular tape, the rectangular tape is pasted on the top surface of the plastic frame away from the substrate and on the outer surface of the film set to connect the plastic frame and the film set, the outer surface of the film set corresponding to the top surface of the plastic frame facing a stepped surface recessed in the housing space.

To solve the above technical issue, the present disclosure provides a manufacturing method of backlight module, comprising: printing a plastic frame, which is adhered to the substrate, on the substrate, the plastic frame forming a housing space together with the substrate; providing a light guide plate in the housing space; and stacking a film set on the light guide plate.

Wherein, the step of printing a plastic frame, which is adhered to the substrate, on the substrate comprises: 3D printing the plastic frame, which is adhered to the edge of the substrate, on the substrate.

Wherein, the substrate is a metal back, the step of providing a light guide plate in the housing space comprises: providing a reflective sheet in the housing space, stacking the light guide plate on the reflective sheet.

Wherein, the metal back is the reflective sheet.

Wherein, the outer surface of the film set corresponding to the top surface of the plastic frame away from the substrate facing a stepped surface recessed in the housing space, the manufacturing method further comprises: using a rectangular tape to paste the top surface of the plastic frame and the outer surface of the film set.

The beneficial effects of the present disclosure are as follows. Distinguishing from the prior art, the backlight module according to the present disclosure comprises a substrate, a plastic frame, a light guide plate, and a film set. Wherein, the plastic frame is pasted on the substrate through printing, which forms a housing space together with the substrate. The light guide plate and the film set are sequentially stacked in the housing space. In the present disclosure, the plastic frame is directly printed on the substrate without double-sided adhesive attached to the substrate. Therefore, the light guide plate and the film in the housing space will not be elevated by the double-sided adhesive. Even after assembling the liquid crystal panel, the interval within the light guide plate, the film set and the panel will not shrink. There will be enough space for the thermal expansion and deformation of the film set. Therefore, the problem of the wave pattern will not appear, which will not affect the display of the liquid crystal display panel.

DETAILED DESCRIPTION OF THE PREFERRED EMBODIMENTS

Figure 1:
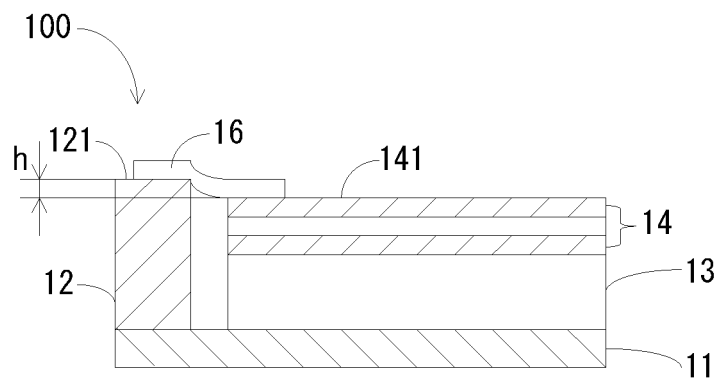
FIG. 1 is a schematic view illustrating the structure of the backlight module according to the first embodiment of the present disclosure.
Figure 2:
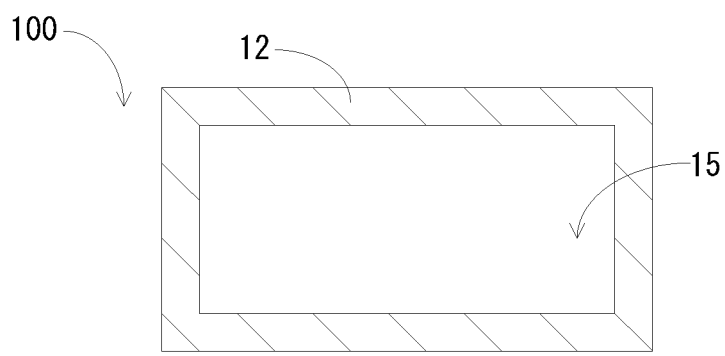
FIG. 2 is a top view of the backlight module according to the first embodiment of the present disclosure.

Referring to FIGS. 1 and 2, FIG. 1 is a schematic view illustrating the structure of the backlight module according to the first embodiment of the present disclosure, and FIG. 2 is a top view of the backlight module according to the first embodiment of the present disclosure. The backlight module 100 according to the present embodiment comprises a substrate 11, a plastic frame 12, a light guide plate 13, and a film set 14.

The plastic frame 12 is pasted on the substrate 11 through printing. Specifically, the plastic frame 12 is formed directly on the edge of the substrate 11 through 3D printing. That is, utilize the powdered plastic material or metal bonded material to print layer by layer on the substrate 11 to form plastic or metal frame.

The plastic frame 12 is around the substrate 11 and forms a housing space 15 together with the substrate 11. The light guide plate 13 and the film set 14 are sequentially stacked in the housing space 15.

In the present embodiment, the substrate 11 is a reflective sheet. The light guide plate 13 is provided on the reflective sheet. The reflective sheet can improve the light utilization.

Figure 3:
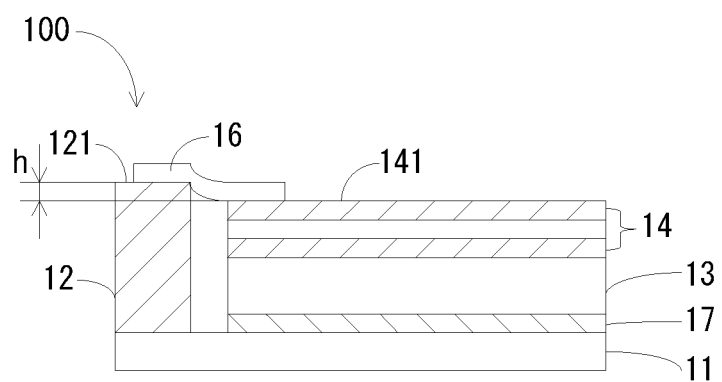
FIG. 3 is a schematic view illustrating the structure of the backlight module according to the second embodiment of the present disclosure.

In the other embodiment, according to the different using condition of the backlight module 100, the substrate 11 can also be metal back. Specifically, as shown in FIG. 3, FIG. 3 is a schematic view illustrating the structure of the backlight module according to the second embodiment of the present disclosure. Wherein, the plastic frame 12 is formed at the edge of the metal back. In order to improve the light utilization, the reflective sheet 17 can be further provided between the light guide plate 13 and the metal back, or directly coat a reflective layer on the metal back.

The backlight module 100 further comprises a rectangular tape 16. The rectangular tape 16 is pasted on the top surface 121 of the plastic frame 12 away from the substrate 11 and on the outer surface 141 of the film set 14 to connect the plastic frame 12 and the film set 14. The rectangular tape 16 is black, which is used for connecting the plastic frame 12 and the film set 14 and also preventing light leakage.

In the present embodiment, the outer surface 141 of the film set 14 corresponding to the top surface 121 of the plastic frame 12 faces a stepped surface recessed in the housing space 15. That is, there is a certain height gap h between the outer surface 141 of the film set 14 and the top surface 121 of the plastic frame 12. The height gap h is ranged from 0.02 to 0.03 mm. After assembling liquid crystal panel, the film set 14 will have a certain deformation space after thermal expansion due to the height gap.

Distinguishing from the prior art, the backlight module according to the present disclosure comprises a substrate, a plastic frame, a light guide plate, and a film set. Wherein, the plastic frame is pasted on the substrate through printing, which forms a housing space together with the substrate. The light guide plate and the film set are sequentially stacked in the housing space. In the present disclosure, the plastic frame is directly printed on the substrate without double-sided adhesive attached to the substrate. Therefore, the light guide plate and the film in the housing space will not be elevated by the double-sided adhesive. Even after assembling the liquid crystal panel, the interval within the light guide plate, the film set and the panel will not shrink. There will be enough space for the thermal expansion and deformation of the film set. Therefore, the problem of the wave pattern will not appear, which will not affect the display of the liquid crystal display panel.

Figure 4:
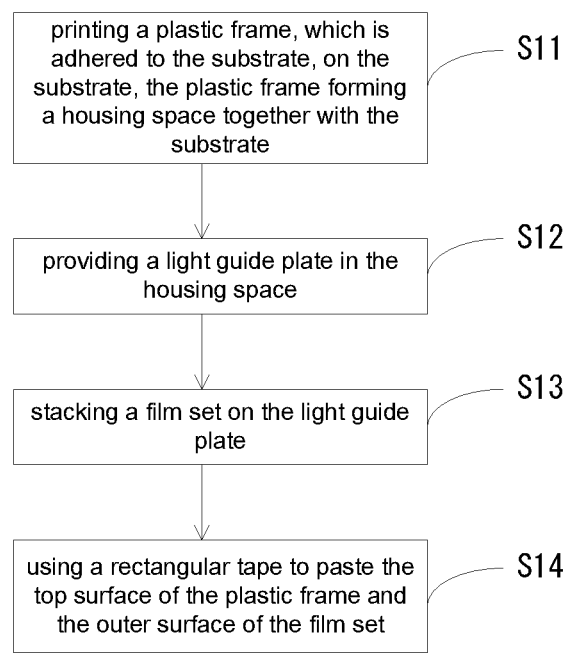
FIG. 4 is a flow diagram of the manufacturing method of backlight module according to the first embodiment of the present disclosure.

Referring to FIG. 4, FIG. 4 is a flow diagram of the manufacturing method of backlight module according to the first embodiment of the present disclosure. The manufacturing method according to the present embodiment comprises:

S11: printing a plastic frame, which is adhered to the substrate, on the substrate, the plastic frame forming a housing space together with the substrate.

In the present step S11, specifically, the plastic frame is formed directly on the edge of the substrate through 3D printing.

S12: providing a light guide plate in the housing space.

The substrate according to the present embodiment is a reflective sheet. The present step S12 directly forms the light guide plate on the reflective sheet.

In the other embodiment, the substrate can be a metal back. At this time, the present step S12 further comprises:
S121: providing a reflective sheet in the housing space; and
S122: stacking the light guide plate on the reflective sheet.
S13: stacking a film set on the light guide plate.

After the step, the plastic frame and the film set are on the back sheet. Wherein, the outer surface of the film set corresponding to the top surface of the plastic frame away from the substrate faces a stepped surface recessed in the housing space.

S14: using a rectangular tape to paste the top surface of the plastic frame and the outer surface of the film set.

The rectangular tape is used to black. When connecting the plastic frame and the film set, it also prevents light leakage.

Using the present manufacturing method can obtain the backlight module 100. Therefore, the specific structure of the backlight module obtained by the above manufacturing method will not be repeated.

Distinguishing from the prior art, the backlight module obtained by the manufacturing method of the backlight module according to the present invention will not affect the display of the liquid crystal display panel during thermal expansion.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A backlight module, comprising a substrate, a plastic frame, a light guide plate, and a film set, the plastic frame being formed directly on an edge of the substrate through 3D printing, so as to form a housing space together with the substrate, the light guide plate and the film set being sequentially stacked in the housing space;
   the backlight module further comprising a rectangular tape, the rectangular tape being pasted on a top surface of the plastic frame away from the substrate and an outer surface of the film set to connect the plastic frame and the film set, the outer surface of the film set being recessed with respect to the top surface of the plastic frame to form a stepped surface recessed in the housing space;
   wherein the light guide plate is received in the housing space defined by the plastic frame and the substrate and is positioned on a portion of the substrate other than the edge of the substrate on which the plastic frame is formed.

2. The backlight module as claimed in claim 1, wherein the substrate is a metal back.

3. The backlight module as claimed in claim 1, wherein the substrate is a reflective sheet.

4. A backlight module, comprising a substrate, a plastic frame, a light guide plate, and a film set, the plastic frame being pasted on and directly attached to a first portion of the substrate through printing, so as to form a housing space together with the substrate, the light guide plate and the film set being sequentially stacked in the housing space;

wherein the light guide plate is received in the housing space defined by the plastic frame and the substrate and is positioned on a second portion of the substrate different from the first portion of the substrate to which the plastic frame is attached.

5. The backlight module as claimed in claim 4, wherein the first portion of the substrate comprise an edge of the substrate and the plastic frame is formed directly on the edge of the substrate through 3D printing.

6. The backlight module as claimed in claim 4, wherein the substrate is a metal back.

7. The backlight module as claimed in claim 4, wherein the substrate is a reflective sheet.

8. The backlight module as claimed in claim 4, wherein the backlight module further comprises a rectangular tape, which is pasted on a top surface of the plastic frame away from the substrate and an outer surface of the film set to connect the plastic frame and the film set, the outer surface of the film set being recessed with respect to the top surface of the plastic frame to form a stepped surface recessed in the housing space.

9. A manufacturing method of backlight module, comprising:

printing a plastic frame on a substrate to have the plastic frame directly attached to a first portion of the substrate, the plastic frame forming a housing space together with the substrate;

providing a light guide plate in the housing space; and
stacking a film set on the light guide plate;

wherein the light guide plate is received in the housing space defined by the plastic frame and the substrate and is positioned on a second portion of the substrate different from the first portion of the substrate to which the plastic frame is attached.

10. The manufacturing method as claimed in claim 9, wherein the step of printing a plastic frame on a substrate comprises:

3D printing the plastic frame on an edge of the substrate, such that the plastic frame is adhered to the edge of the substrate.

11. The manufacturing method as claimed in claim 9, wherein the substrate is a metal back, and the step of providing a light guide plate in the housing space comprises:

providing a reflective sheet in the housing space, and stacking the light guide plate on the reflective sheet.

12. The manufacturing method as claimed in claim 9, wherein the metal back is the reflective sheet.

13. The manufacturing method as claimed in claim 9, wherein an outer surface of the film set is recessed with respect to a top surface of the plastic frame away from the substrate so as to form a stepped surface recessed in the housing space, and the manufacturing method further comprises:

using a rectangular tape to paste the top surface of the plastic frame and the outer surface of the film set.

* * * * *